United States Patent
Miyata (10) Patent No.: US 10,356,659 B2
(45) Date of Patent: Jul. 16, 2019

(54) BASE STATION, RELAY STATION, AND WIRELESS COMMUNICATION SYSTEM

(71) Applicant: KYOCERA CORPORATION, Kyoto (JP)

(72) Inventor: Takeo Miyata, Toyonaka (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/261,038

(22) Filed: Sep. 9, 2016

(65) Prior Publication Data

US 2017/0078919 A1 Mar. 16, 2017

(30) Foreign Application Priority Data

Sep. 14, 2015 (JP) ................................. 2015-180467

(51) Int. Cl.
*H04W 28/08* (2009.01)
*H04W 16/32* (2009.01)
*H04B 7/155* (2006.01)
*H04W 84/04* (2009.01)

(52) U.S. Cl.
CPC ........ *H04W 28/08* (2013.01); *H04B 7/15507* (2013.01); *H04W 16/32* (2013.01); *H04W 84/047* (2013.01)

(58) Field of Classification Search
CPC ... H04B 7/155; H04B 7/15507; H04W 16/04; H04W 16/32; H04W 24/02; H04W 28/08; H04W 28/085; H04W 36/04; H04W 36/22; H04W 52/24; H04W 72/0446; H04W 72/0486; H04W 84/10; H04W 84/045; H04W 84/047; H04L 5/0032; H04L 5/0096; Y02B 60/50

See application file for complete search history.

(56) References Cited

U.S. PATENT DOCUMENTS

| | | | | |
|---|---|---|---|---|
| 8,761,021 B2* | 6/2014 | Ray | ...................... | H04W 36/22 370/231 |
| 2013/0003534 A1* | 1/2013 | Henry et al. | | |
| 2013/0210445 A1* | 8/2013 | Nakamura | ............ | H04W 16/32 455/448 |
| 2015/0245270 A1* | 8/2015 | Wu | ....................... | H04W 36/22 370/331 |

FOREIGN PATENT DOCUMENTS

| | | |
|---|---|---|
| JP | 2013-543688 A | 12/2013 |
| JP | 2014-522211 A | 8/2014 |
| JP | 2014-216758 A | 11/2014 |
| WO | 2012/073410 A1 | 6/2012 |
| WO | 2014/090104 A1 | 6/2014 |

* cited by examiner

*Primary Examiner* — Marsha D Banks Harold
*Assistant Examiner* — Dharmesh J Patel
(74) *Attorney, Agent, or Firm* — Studebaker & Brackett PC (57) ABSTRACT

A wireless communication system includes a base station; and a relay station capable of wireless connection to the base station; wherein, in a case where a plurality of relay stations is accommodated with using a wireless connection, if a load state of traffic of the base station does not meet criteria, the base station selects at least one relay station, which is to perform the accommodation switching to meet the criteria, among the plurality of relay stations, and controls the selected relay station to perform the accommodation switching, and when the relay station is selected by the base station, the relay station switches a wireless connection to another base station.

18 Claims, 5 Drawing Sheets

BASE STATION, RELAY STATION, AND WIRELESS COMMUNICATION SYSTEM

CROSS-REFERENCE TO RELATED APPLICATION

This application claims priority from Japanese Patent Application No. 2015-180467 filed on Sep. 14, 2015, the entire subject matter of which is incorporated herein by reference.

TECHNICAL FIELD

This disclosure relates to a base station, a relay station, and a wireless communication system which perform wireless communication.

BACKGROUND

In a fifth generation system which is considered as a further development of the wireless communication system, the use of a small-cell to reduce a communication area will be inevitable as a measure to further enhance throughput and frequency usage efficiency.

If the small-cell is introduced, the number of small-cell is increased dramatically so that the small-cells exist all over the city, and installing a cable line (such as an optical line) for connecting all small-cell base station (a relay station) to a backhaul is difficult in view of cost and construction. Accordingly, it has been studied that wireless is used as a line for connecting a small-cell base station to a backhaul. As a specific example, a large-cell base station and a small-cell base station are connected wirelessly.

The use of wireless for such a backhaul is not limited to areas such as isolated islands or sparsely populated areas that a wired communication is not available and will be extended to urban areas or the like in order to reduce a installation cost of the wiring (for example, see JP-A-2014-216758).

Since the laying of wires for connecting the network is not required, it is possible to add more small-cells with a degree of freedom.

Meanwhile, in order to perform wireless communication between a remote wired line side portion and a small-cell base station (a relay station), a dedicated wireless device is mainly used in the background device for realizing a wireless backhaul system.

SUMMARY

However, if a dedicated wireless device is installed in each of a small-cell base station (a relay station) and a remote wired line side, an installation cost and a construction cost are increased. On the other hand, in a case where a small-cell base station and a large-cell base station are connected wirelessly, it may not possible to appropriately process the traffic according to various traffic situations considering the fifth generation system.

Accordingly, this disclosure provides a base station, a relay stations and a wireless communication system, by which the small-cell base station (a relay station) can be properly accommodated in another large-cell base station according to a traffic situation of a large-cell base station.

A wireless communication system of this disclosure includes: a base station; and a relay station capable of wireless connection to the base station; wherein, in a case where a plurality of relay stations is accommodated with using a wireless connection, if a load state of traffic of the base station does not meet criteria, the base station selects at least one relay station, which is to perform the accommodation switching to meet the criteria, among the plurality of relay stations, and controls the selected relay station to perform the accommodation switching, and wherein, when the relay station is selected by the base station, the relay station switches a wireless connection to another base station.

In the above described wireless communication system, the base station may select a relay station such that a traffic volume of the base station becomes maximum in a case of assuming that the said relay station performs the accommodation switching.

In the above described wireless communication system, the base station may select a relay station such that at least one of a band width between a wireless backhaul and the relay station, a MIMO multiplexing number and an adaptive modulation order becomes smallest in a case of assuming that said relay station performs the accommodation switching.

In the above described wireless communication system, when selecting the relay station, the base station may determine another base station to which the relay station is capable of switching, and when the relay station is selected by the base station, the relay station may switch a wireless connection to the determined base station.

The above described wireless communication system may include a center device, wherein, when the base station selects the relay station, the center device determines another base station to which the relay station is capable of switching, and when the relay station is selected by the base station, the relay station changes a wireless connection to the determined base station.

In the above described wireless communication system, the center device may select a relay station such that a traffic volume of the entire wireless communication system becomes maximum in a case of assuming that said relay station performs the accommodation switching.

In the above described wireless communication system, when the relay station selected by the base station, the relay station may determine another base station, to which the relay station is capable of switching, and switches a wireless connection to the determined base station.

In the above described wireless communication system, when the relay station is selected by the base station, the relay station may form a list indicating a priority of a base station, to which the relay station is capable of switching, confirms whether the base station is capable of wireless connection to the relay station in order of the list, and switches to the base station capable of wireless connection.

This disclosure is to provide a base station, a relay station, and a wireless communication system, by which a relay station can be properly accommodated in another large-cell base station according to a traffic situation of a large-cell base station.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, embodiments of this disclosure will be described with reference to the drawings.

Figure 1:
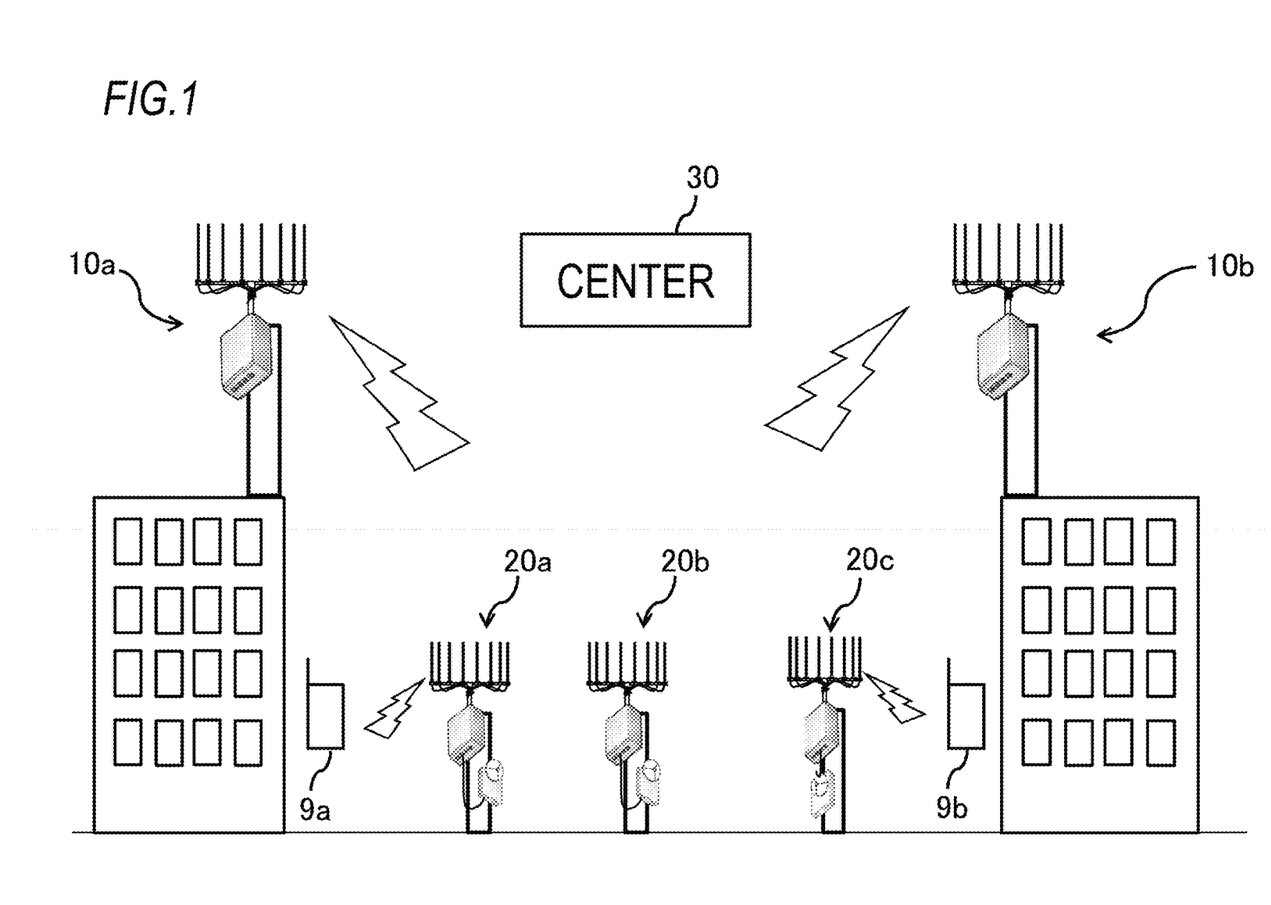
FIG. 1 is a diagram illustrating a wireless communication system according to an embodiment of this disclosure.

FIG. 1 is a diagram illustrating a wireless communication system according to an embodiment of this disclosure.

The wireless communication system includes, for example, (a relay station), a center 30, and a wireless terminal 9.

A large-cell base station 10 will be described as large-cell base stations 10a and 10b in a case of being distinguished respectively and will be described as the large-cell base station 10 in a case of not being distinguished respectively. A small-cell base station 20 will be described as small-cell base stations 20a, 20b, and 20c in case of being distinguished respectively and will be described as a small-cell base station 20 in case of not being distinguished respectively. A wireless terminal 9 will be described as wireless terminals 9a and 9b in a case of being distinguished respectively and will be described as a wireless terminal 9 in a case of not being distinguished respectively.

A large-cell base station 10 is a base station that enable wireless communication within a wide range area, so-called a large-cell (a macro cell). The large-cell base station 10, as illustrated in FIG. 1, is placed on a structure such as a building.

A small-cell base station 20 is a base station that enable wireless communication within a narrow range area, so called a small-cell. The small-cell includes a micro cell, a pico cell, or a femto cell. It is expected that the small-cell base station 20 is installed all over the city in the future.

A center 30 is a device that controls and manages the large-cell base station 10. It appears likely to be present in the air in FIG. 1 but is only illustrated for convenience sake. The center 30, in practice, is connected to the large-cell base station 10 on the network. Further, the center 30 may be configured to control and manage the small-cell base station 20.

A wireless terminal 9 is capable of wireless connection to and communicate with the small-cell base station 20. Further, the wireless terminal 9 is capable of wireless connection to and communicate with the large-cell base station 10, but in the embodiment of this disclosure, an example that the wireless terminal 9 is capable of wireless connection to the small-cell base station 20 will be described.

The small-cell base station 20 does not have a wired backhaul line and is connected to the large-cell base station 10 through a wireless backhaul. In this case, the large-cell base station 10 can be connected to a plurality of small-cell base station 20 through the wireless backhaul.

Figure 2:
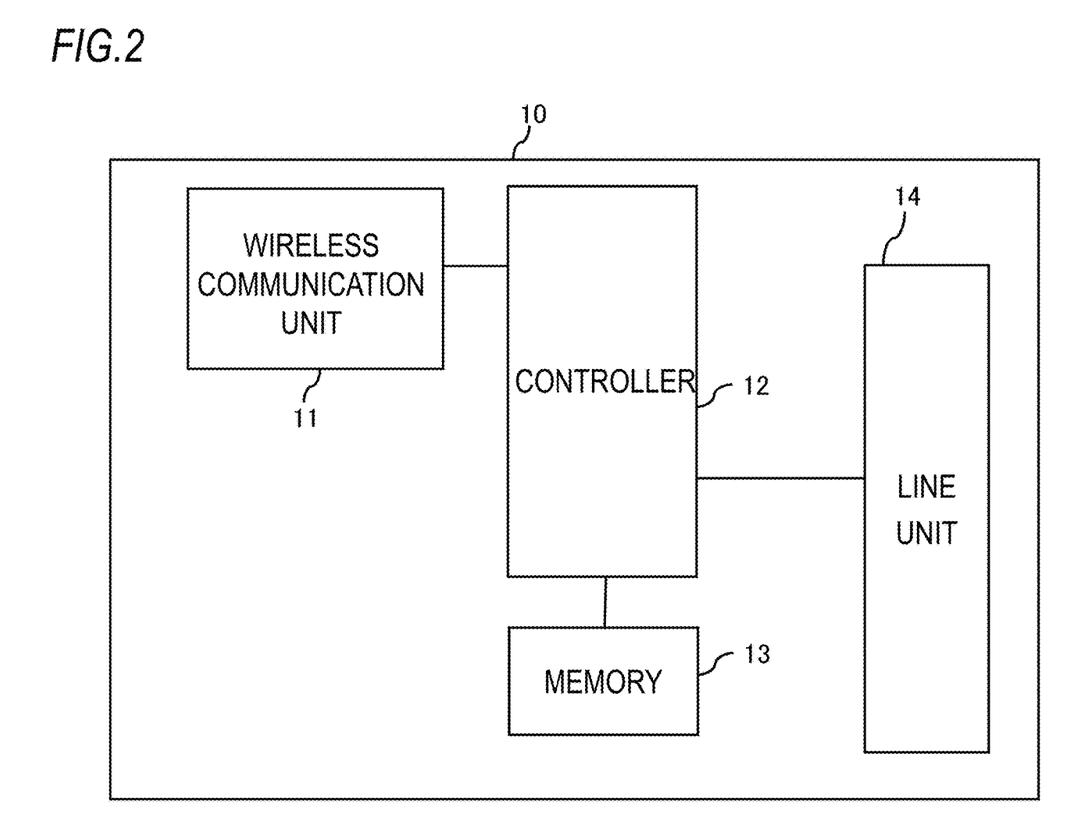
FIG. 2 is a block diagram of a large-cell base station according to an embodiment of this disclosure.
Figure 3:
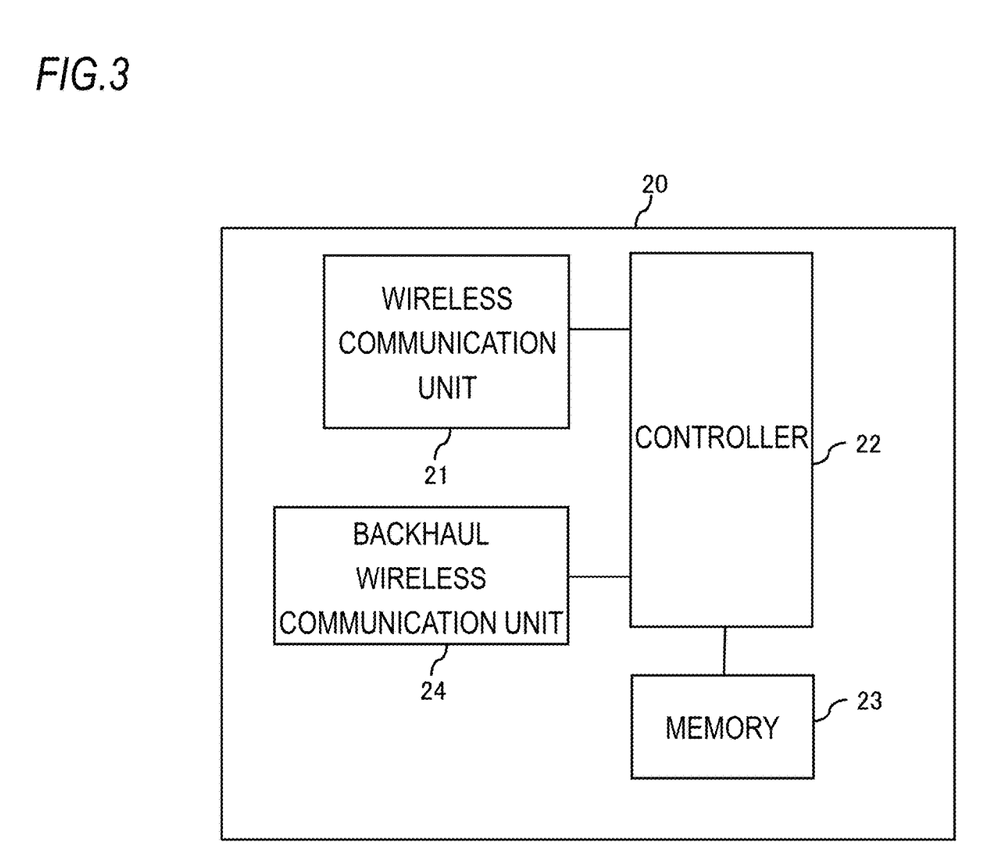
FIG. 3 is a block diagram of a small-cell base station according to an embodiment of this disclosure.

Subsequently, a configuration of a large-cell base station and a small-cell base station according to an embodiment of this disclosure will be described with reference to the drawings.

FIG. 2 is a block diagram of a large-cell base station according to an embodiment of this disclosure.

A large-cell base station 10 is configured by a wireless communication unit 11, a controller 12, a memory 13 and a line unit 14.

The wireless communication unit 11 is configured to wirelessly communicate with a wireless terminal 9. The wireless communication unit 11 is configured to output information, which is transmitted from the wireless terminal 9, to the controller 12, and to transmit the information, which is output from the controllers, to the wireless terminal 9. The wireless communication unit 11 is configured to wirelessly communicate with the small-cell base station 20. The wireless communication unit 11 has a plurality of adaptive array antenna and may perform beam forming.

The controller 12 controls the wireless communication unit 11 and the line unit 14 and is configured to output the information, which is output from the wireless communication unit 11, to the line unit 14 and to output the information, which is output from the line section 14, to the wireless communication unit 11. The details of a process executed by the controller 12 will be described as an operation of the large-cell base station 10 below.

The line unit 14 may communicate with another large-cell base station 10 and the center 30 through a backhaul line (network).

FIG. 3 is a block diagram of a small-cell base station according to an embodiment of this disclosure.

The small-cell base station 20 is configured by a wireless communication unit 21, a controller 22, a memory 23 and a backhaul wireless communication unit 24.

The wireless communication unit 21 is configured to wirelessly communicate with wireless terminals 9. The wireless communication unit 21 is configured to output information, which is transmitted from the wireless terminal 9, to the controller 22, and to transmit the information, which is output from the controller 22, to the wireless terminal 9. The wireless communication unit 21 has a plurality of adaptive array antenna and may perform beam forming.

The controller 22 controls the wireless communication unit 21 and the line unit 14, and is configured to output information, which is output from the wireless communication unit 11, to the backhaul wireless communication unit 24 and to output the information, which is output from the backhaul wireless communication unit 24, to the wireless communication unit 21. The details of a process executed by the controller 22 will be described as an operation of the small-cell base station 20 below.

The backhaul wireless communication unit 24 may communicate with the large-cell base station 10 through wireless as the backhaul line. Incidentally, the backhaul wireless communication unit 24 has a plurality of adaptive array antenna and may perform beam forming.

Next, an operation example of a wireless communication system according to an embodiment of this disclosure will be described with reference to the drawings.

First Embodiment of this Disclosure

Figure 4:
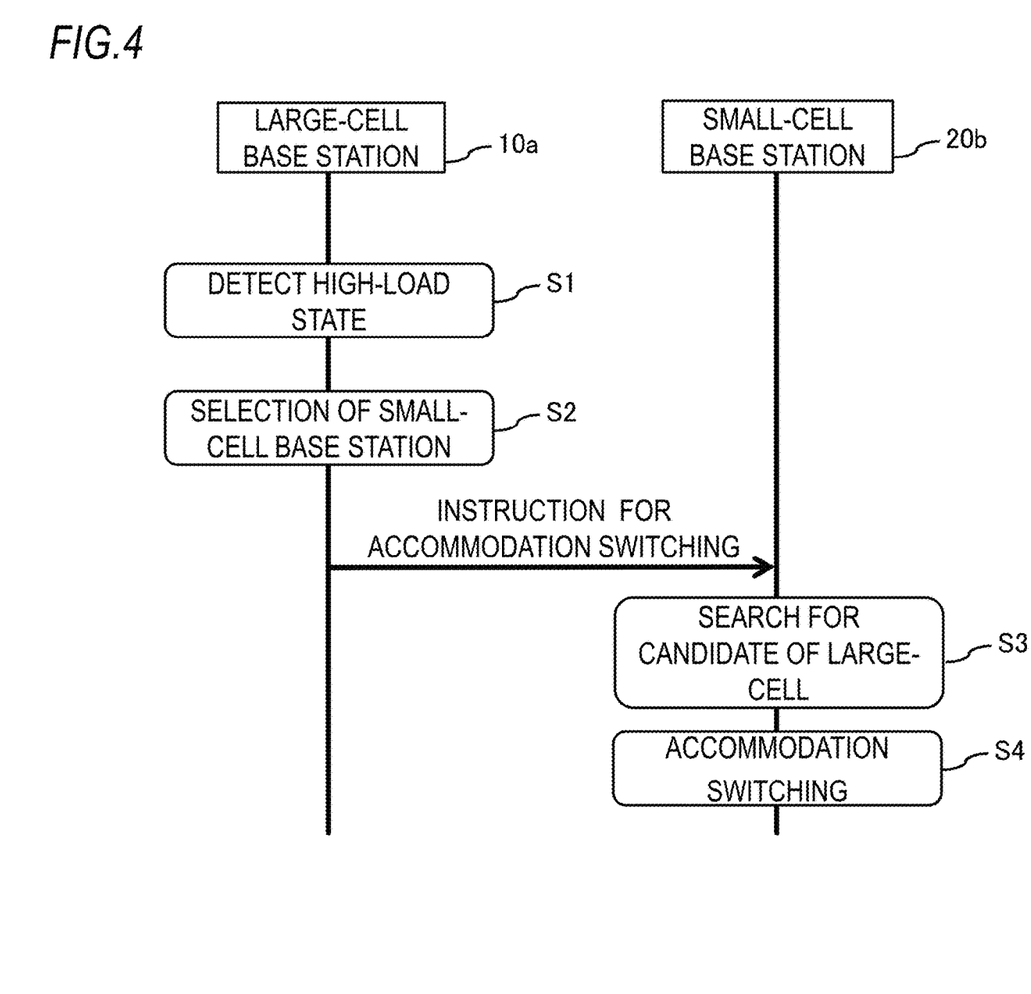
FIG. 4 is a diagram illustrating an operation example of a wireless communication system according to a first embodiment of this disclosure.

FIG. 4 is a diagram illustrating an operation example of a wireless communication system according to a first embodiment of this disclosure.

Here, it is assumed that a large-cell base station 10a accommodates small-cell base stations 20a, 20b, and 20c. The small-cell base stations 20a, 20b, and 20c are communicated through the large-cell base station 10a as a backhaul line.

If the small-cell base station 20 communicates with a number of wireless terminal 9 or performs a large amount of data communication, the large-cell base station 10a needs to handle a large amount of traffic and thus the traffic load exceeds a reference value. In other words, there is a case where a load state of the traffic does not meet criteria. At this time, the large-cell base station 10a detects a high-load state (S1).

The traffic may be data transfer amount, a momentary maximum call amount, or the like. Further, the large-cell base station 10 may wait and monitor a situation for a predetermined time period in a case where the traffic volume exceeds only once the criteria. If the traffic volume exceeds continuously the criteria for a predetermined time, the large-cell base station 10 may detect a high-load state.

(Selection of a Small-Cell Base Station: Part 1)

Then, when detecting the high-load state, the large-cell base station 10a selects at least one small-cell base station 20, which is to perform the accommodation switching, so as to meet the reference value among the small-cell base stations 20a, 20b, and 20c (S2).

For example, in a case where the traffic volumes of the small-cell base stations 20a, 20b, and 20c are 50, 20, and 30 respectively, if the reference value is 80, the total traffic volume is 100 and thus exceeds the reference value 80. Therefore, the large-cell base station 10a selects the small-cell base station 20 that is to perform the accommodation switching so as not to exceed the reference value 80.

For example, assuming that the small-cell base station 20a performs the accommodation switching, since the total traffic volume of the small-cell base stations 20b and 20c becomes 50 and does not exceed the reference value 80, the small-cell base station 20a can be selected.

For example, assuming that the small-cell base station 20b performs the accommodation switching, since the total traffic volume of the small-cell base stations 20a and 20c becomes 80 and does not exceed the reference value 80, the small-cell base station 20b can be selected.

For example, assuming that the small-cell base station 20c is performs the accommodation switching, since the total traffic volume of the small-cell base stations 20a and 20b becomes 70 and does not exceed the reference value 80, the small-cell base station 20c can be selected.

In the first embodiment of this disclosure, the small-cell base station 20b is selected, because the traffic volume of the large-cell base station 10a becomes maximum (80) in a case of assuming that the small-cell base station 20 performs the accommodation switching.

In other words, when trying to performs the accommodation switching of the small-cell base station 20, the large-cell base station 10 select the small-cell base station 20 such that the traffic volume of the large-cell base station 10 becomes maximum, in a case of assuming that the particular small-cell base station 20 performs the accommodation switching.

In the example described above, one small-cell base station 20 is selected. However, even when two small-cell base stations 20 are selected, the traffic load of the large-cell base station 10a does not exceed the reference value. Here, if the number of small-cell base station 20 to be selected is one or two, the large-cell base station 10a select one that is being the minimum numbers. In short, when there is a plurality of the small-cell base station 20 that can be selected, the large-cell base station 10 selects the minimum number thereof and selects a small-cell base station 20 corresponding to the minimum number.

(Selection of a Small-Cell Base Station: Part 2)

As an alternative of step S2, the large-cell base station 10a may select a small-cell base station 20, where a band width between a wireless backhaul and the small-cell base stations 20 (or MIMO multiplexing number and adaptive modulation order) is minimum value.

Incidentally, the large-cell base station 10a may select a small-cell base station 20 by combining the Parts 1 and 2 of "selection of the small-cell base station" described above.

(Selection of a Small-Cell Base Station: Part 3)

As an alternative of step S2, the large-cell base station 10a selects first one small-cell base station 20 as described above and then selects the most appropriate another large-cell base station 10, based on the position of the selected small-cell base station 20 and another large-cell base station 10, the signal level of the small-cell base station 20 and another large-cell base station 10 (for example, SINR: SIGNAL-TO-INTERFERENCE-NOISE RATIO), and the remaining traffic volume of another large-cell base station 10. The position, the signal level, and the remaining traffic volume, as described in above, may be obtained from the center 30.

In a case where there is no most appropriate another large-cell base station 10 for the small-cell base station 10, the large-cell base station 10a selects a next small-cell base station 20 and then selects the most appropriate another large-cell base station 10 for the next small-cell base station 20. If there is no most appropriate another large-cell base station 10, the large-cell base station 10a also repeat it.

Next, the large-cell base station 10a instruct the small-cell base station 20 (the small-cell base station 20b in this case) selected in step S2 to perform the accommodation switching, and the small-cell base station 20b searches for a candidate of another large-cell base station 10 (S3). A case of searching for a candidate of another large-cell base station 10 is a case where the Parts 1 and 2 of "selection of the small-cell base station" described above is executed. Regarding Part 3, since another large-cell base station 10 is already determined, the small-cell base station 20b performs a process of the accommodation switching into the determined large-cell base station 10.

Here, regarding the search for a candidate of the large-cell base station 10, for example, small-cell base station 20b forms a list of priorities as a candidate of the most appropriate another large-cell base station 10, based on the position of another large-cell base station 10, the signal level of another large-cell base station 10, and the remaining traffic volume of another large-cell base station 10. In a case where there is no appropriate another large-cell base station 10 at all, the small-cell base station 20b cannot perform the accommodation switching, and the large-cell base station 10a allows a re-connection from the small-cell base station 20b.

Next, the small-cell base station 20b tries to perform the accommodation switching into the large-cell base station 10 having the highest priority, based on the formed priority list of the candidate of the large-cell base station 10. If the accommodation switching cannot be performed, the accommodation switching into the next large-cell base station 10 is sequentially tried (S4).

As described above, in the wireless communication system according to a first embodiment of this disclosure, when accommodating a plurality of small-cell base station 20 by wireless connection, if the load state of traffic of the own base station does meets the criteria, the large-cell base station 10 selects at least one small-cell base station 20 that is to perform the accommodation switching to meet the criteria among a plurality of small-cell base station 20. According to the accommodation switching with respect to the selected small-cell base station 20, the small-cell base station 20 can be properly accommodated in another large-cell base station 10 based on traffic situation of the large-cell base station 10.

Second Embodiment of this Disclosure

Figure 5:
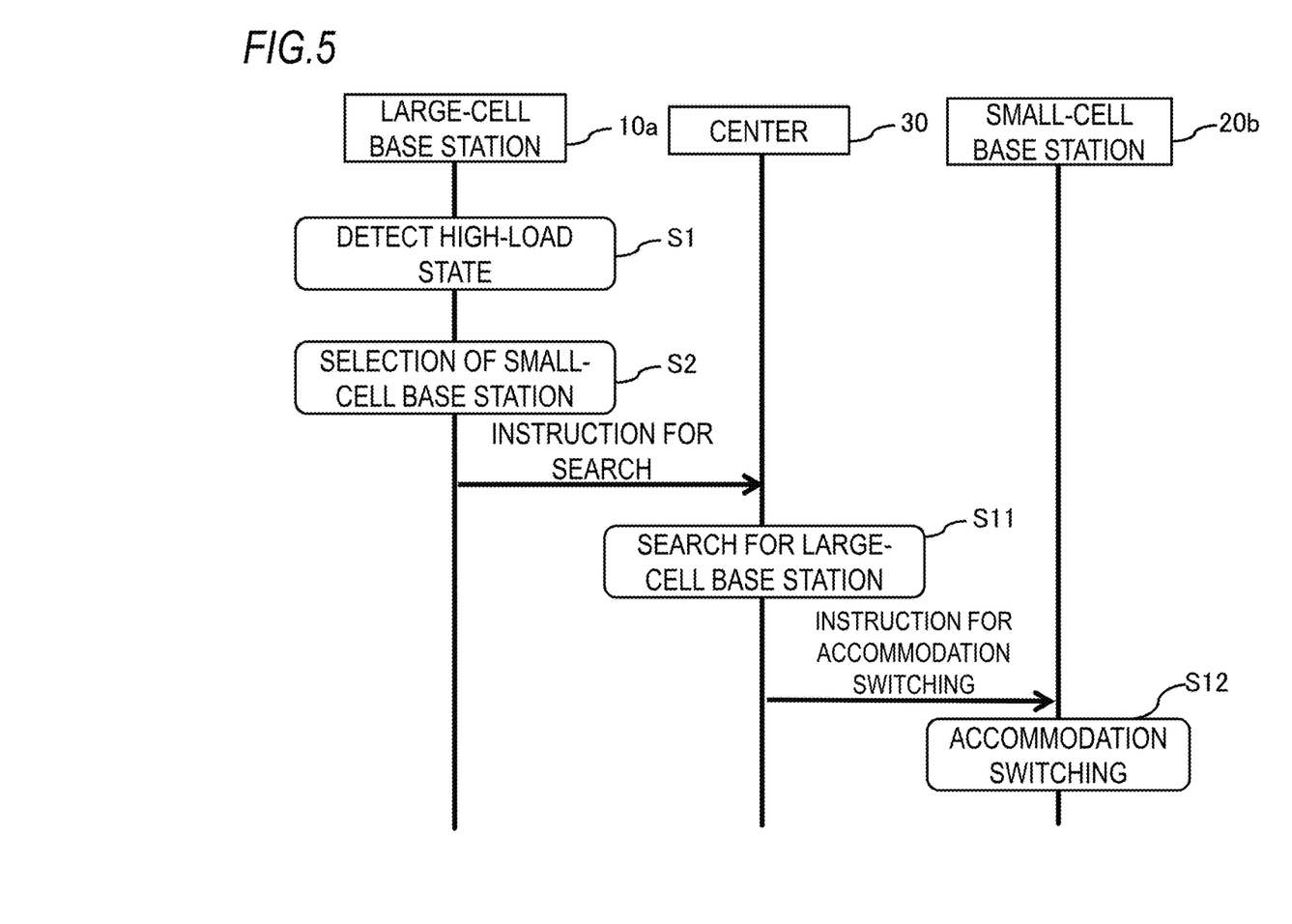
FIG. 5 is a diagram illustrating an operation example of a wireless communication system according to a second embodiment of this disclosure.

FIG. 5 is a diagram illustrating an operation example of a wireless communication system according to a second embodiment of this disclosure.

Here, it is assumed that a large-cell base station 10a accommodates small-cell base stations 20a, 20b, and 20c. The small-cell base stations 20a, 20b, and 20c are communicating through a large-cell base station 10a as a backhaul line.

Steps S1 and S2 are similar to those in the first embodiment of this disclosure, and thus the description thereof will not be presented.

The large-cell base station 10a notifies the center 30 of the small-cell base station 20 (here, the small-cell base station 20b) that is selected in step S2, and instruct to search for the large-cell base station 10, in which the selected small-cell base station 20 is to be accommodated next.

Next, when receiving the instruction, the center 30 searches for a candidate of another large-cell base station 10 (excluding large-cell base station 10a) in which the small-cell base station 20b is to be accommodated (S11).

For example, the center 30 searches for the most appropriate another large-cell base station 10 based on the position of the small-cell base station 20b and another large-cell base station 10, the signal level of the small-cell base station 20 and another large-cell base station 10, and the remaining traffic volume of another large-cell base station 10 which are notified. The center 30 may set the most appropriate another large-cell base station 10 as a candidate and may sequentially create a list of priorities.

The center 30 notifies the small-cell base station 20b of the searched large-cell base station 10 or the list of priorities thereof.

Then, the small-cell base station 20b performs the accommodation switching into the large-cell base station 10 which is notified, or performs the accommodation switching into the large-cell base station 10 having the highest priority based on the priority list of a candidate of the notified large-cell base station 10 (S12).

As described above, in the wireless communication system according to the second embodiment of this disclosure, the center 30 searches the appropriate another large-cell base station 10, and performs the accommodation switching of the small-cell base station 20 into the searched large-cell base station 10. Therefore, it is possible to more certainly perform the accommodation switching of the small-cell base station 20 into another large-cell base station 10.

The center device 30 may perform step S2 instead of the large-cell base station 10a, and may select a small-cell base station 20, because the traffic volume of the entire wireless communication system becomes maximum value in a case of assuming that the small-cell base station 20 performs the accommodation switching.

By the way, since traffic characteristics of each of the small-cell base station 20 is different in time and circumstances, the traffic situation of the wireless terminal 9 and the small-cell base station 20 that are connected to the large-cell base station 10 is changed. There is a case where the large-cell base station 10 cannot accommodate the maximum traffic when accommodating a plurality of the small-cell base station 20 having traffic characteristics of a load. To avoid this, in the same large-cell base station 10, it is effective to select a slave station having the different traffic characteristics or to quickly change the small-cell base station 20 when felling into a problem situation. Thus, if a control of distributing the generated traffic to all over the system can be achieved, operation is possible with the minimum required wire line.

In other examples, the accommodation switching of the small-cell base station 20 may be performed in the time zone where the number of user using the wireless communication is small, for example at late night. When there is no a wireless terminal 9 connected to the corresponding small-cell base station 20 and thus it is possible to immediately perform the accommodation switching, the accommodation switching may be immediately performed.

In other embodiment, the small-cell base station 20 can perform a smart antenna process using an adaptive array for a large-cell base station 10. The small-cell base station 20 learns and continuously uses transmitting and receiving weight information of the smart antenna process with respect to the large-cell base station 10 which has been connected once. Using this, the small-cell base station 20 can execute over a long time the adaptive array transmitting and receiving weight calculation in super multi-elements (for example, 100) that cannot be executed in a short time and can continuously use the calculated weight for a long time. Thus, it is possible to suppress the ability of the processor mounted on the small-cell base station 20. The small-cell base station 20 can initially start a process using a single transmitting and receiving signal, perform the transmitting and receiving weight calculation in the plurality of antennas as time goes on, and perform the transmitting and receiving process with reflecting the information, at the time of completion.

What is claimed is:

1. A wireless communication system comprising:
a base station that includes a controller;
a relay station of a plurality of relay stations each capable of wireless connection to the base station via a wireless backhaul as well as to a plurality of wireless terminals via wireless cell-based communication; and
a center device, wherein
in response to when the base station controller determines that a load state of traffic of the base station does not meet criteria, the base station controller selects at least one relay station, which is to perform accommodation switching to meet the criteria, from among the plurality of relay stations, and controls the selected relay station to perform the accommodation switching,
the center device that determines, in response to the base station controller selecting the at least one relay station, another base station to which the selected relay station is capable of switching, and
in response to the center device determining the another base station, the selected relay station switches its wireless backhaul connection to the another base station.

2. The wireless communication system according to claim 1,
wherein the base station controller selects a relay station such that a traffic volume of the base station becomes maximum in a case of assuming that the said relay station performs the accommodation switching.

3. The wireless communication system according to claim 1,
wherein the base station controller selects a relay station such that at least one of a band width between a wireless backhaul and the relay station, a MIMO multiplexing number and an adaptive modulation order becomes smallest in a case of assuming that said relay station performs the accommodation switching.

4. The wireless communication system according to claim 1,
wherein, when selecting the relay station, the base station controller determines another base station to which the relay station is capable of switching, and
wherein, when the relay station is selected by the base station controller, the relay station switches a wireless connection to the determined base station.

5. The wireless communication system according to claim 1,
wherein the center device selects a relay station such that a traffic volume of the entire wireless communication system becomes maximum in a case of assuming that said relay station performs the accommodation switching.

6. The wireless communication system according to claim 1,
wherein, when the relay station selected by the base station controller, the relay station determines another base station, to which the relay station is capable of switching, and switches a wireless connection to the determined base station.

7. The wireless communication system according to claim 6,
wherein, when the relay station is selected by the base station controller, the relay station forms a list indicating a priority of a base station to which the relay station is capable of switching, confirms whether the base station is capable of wireless connection to the relay station in order of the list, and switches to the base station capable of wireless connection.

8. A base station capable of wireless connection to a relay station, comprising:
a controller,
wherein, in a case where each of a plurality of relay stations is accommodated with using a wireless backhaul connection to the base station, in response to when a load state of traffic of the base station does not meet criteria, the base station controller selects at least one relay station, which is to perform accommodation switching to meet the criteria, among the plurality of relay stations, and controls the selected relay station to perform the accommodation switching; and
in response to the controller selecting the at least one relay station, the wireless backhaul connection to the at least one relay station is switched to another base station determined by a center device that determines, in response to the base station controller selecting the at least one relay station, the another base station.

9. The base station according to claim 8, wherein the load state of traffic includes at least one of a data transfer amount and a call amount.

10. The base station according to claim 8, wherein the criteria is an instance of the load state of traffic exceeding a reference value.

11. The base station according to claim 8, wherein the criteria is an instance of the load state of traffic continuously exceeding a predetermined volume for a reference value.

12. A relay station capable of wireless connection to a base station, comprising:
a controller,
wherein in a case where each of a plurality of relay stations is accommodated with using a wireless backhaul connection to the base station, in response to when a center device determines, in response to the base station controller selecting the relay station based on a determination that a load state of traffic of the base station does not meet criteria, other base stations to which the relay station is capable of switching, the controller:
forms a list indicating a priority of other base stations to which the relay station is capable of switching,
confirms whether one base station of the other base stations is capable of wireless backhaul connection to the relay station according to an order of the list, and
switches to the one base station of the other base stations confirmed capable of wireless backhaul connection based on the list.

13. The wireless communication system according to claim 1, wherein the load state of traffic includes at least one of a data transfer amount and a call amount.

14. The wireless communication system according to claim 1, wherein the criteria is an instance of the load state of traffic exceeding a reference value.

15. The wireless communication system according to claim 1, wherein the criteria is an instance of the load state of traffic continuously exceeding a reference value for a predetermined time.

16. The base station according to claim 12, wherein the load state of traffic includes at least one of a data transfer amount and a call amount.

17. The base station according to claim 12, wherein the criteria is an instance of the load state of traffic exceeding a reference value.

18. The base station according to claim 12, wherein the criteria is an instance of the load state of traffic continuously exceeding a predetermined volume for a reference value.

* * * * *